United States Patent
Brogly et al.

(10) Patent No.: US 6,588,525 B2
(45) Date of Patent: Jul. 8, 2003

(54) AUTOMOBILE VEHICLE HOOD LOCKING DEVICE

(75) Inventors: Sébastien Brogly, Saint Just (FR); Ghislain George, Vernon (FR); Thierry Renault, Vernon (FR)

(73) Assignee: Peguform France, Saint Marcel (FR)

( * ) Notice: Subject to any disclaimer, the term of this patent is extended or adjusted under 35 U.S.C. 154(b) by 0 days.

(21) Appl. No.: 09/952,417

(22) Filed: Sep. 13, 2001

(65) Prior Publication Data

US 2002/0050414 A1 May 2, 2002

(30) Foreign Application Priority Data

Sep. 13, 2000 (FR) .............................. 00 11676

(51) Int. Cl.⁷ .............................................. B26D 25/10
(52) U.S. Cl. ............. 180/69.21; 180/69.2; 292/DIG. 14
(58) Field of Search ............................. 180/69.2, 69.21, 180/69.22, 69.23, 69.24; 296/146.12, 100.08, 76; 292/DIG. 14

(56) References Cited

U.S. PATENT DOCUMENTS

| | | | | |
|---|---|---|---|---|
| 2,215,606 A | * | 9/1940 | Dunn | 16/144 |
| 3,633,390 A | * | 1/1972 | Wartian | 70/240 |
| 3,767,001 A | * | 10/1973 | Chupick | 180/69.21 |
| 3,893,207 A | * | 7/1975 | Rudaitis | 180/69.2 |
| 4,012,807 A | * | 3/1977 | Kern | 16/128.1 |
| 4,206,944 A | * | 6/1980 | Kumagai et al. | 296/76 |
| 4,458,774 A | * | 7/1984 | Sieren | 180/69.2 |
| 4,753,475 A | * | 6/1988 | Mochida | 296/192 |
| 4,839,941 A | * | 6/1989 | Orlando | 16/361 |
| 5,004,062 A | * | 4/1991 | Foot | 180/69.21 |
| 5,101,921 A | | 4/1992 | West et al. | |
| 5,136,752 A | * | 8/1992 | Bening et al. | 16/287 |
| 5,197,560 A | * | 3/1993 | Oda et al. | 180/69.21 |
| 5,385,212 A | * | 1/1995 | Cady et al. | 180/69.21 |
| 6,257,657 B1 | * | 7/2001 | Sasaki | 296/194 |
| 6,311,796 B1 | * | 11/2001 | Mayer | 180/69.2 |

FOREIGN PATENT DOCUMENTS

| | | | |
|---|---|---|---|
| DE | 42 40 790 C1 | 2/1994 | |
| DE | 198 46 644 A1 | 4/2000 | |
| JP | 358311974 A | * 12/1983 | 180/69.2 |

* cited by examiner

Primary Examiner—Brian L. Johnson
Assistant Examiner—G B Klebe
(74) Attorney, Agent, or Firm—Brooks & Kushman P.C.

(57) ABSTRACT

A vehicle hood includes a wall, connecting devices for mounting the hood on a vehicle chassis fixed to the wall nearer a rear edge of the wall than to its other edges, and a locking member fixed to the wall for locking the hood to the chassis in a closed position. The locking member is nearer the rear edge of the wall than a front edge of the wall opposite the rear edge.

20 Claims, 3 Drawing Sheets

AUTOMOBILE VEHICLE HOOD LOCKING DEVICE

BACKGROUND OF THE INVENTION

1. Field of the Invention

The present invention relates to automobile vehicle hood closure systems.

2. Description of the Prior Art

There exist vehicles in which the hood at the front pivots relative to the structure of the vehicle by means of hinges situated in the rear part of the hood, at the same end as the windshield. There is a single system for locking the hood to the chassis, positioned centrally at the front, or a duplicated system, with symmetrical front lateral positions. The system generally comprises a lock connecting the hood to the structure of the vehicle. This connection to the structure creates a rigid area at the front of the vehicle which, in the event of a frontal impact with a pedestrian, can cause trauma to the hip, in the case of an adult, or to the head, in the case of a child.

One object of the present invention is to provide an automobile vehicle front hood closure system that reduces injury in the event of an impact with a pedestrian.

SUMMARY OF THE INVENTION

To achieve the above object, the present invention provides a vehicle hood including a wall, connecting devices for mounting the mobile hood on a vehicle chassis fixed to the wall nearer a rear edge of the wall than to its other edges, and a locking member fixed to the wall for locking the hood to the chassis in a closed position, which locking member is nearer the rear edge of the wall than a front edge of the wall opposite the rear edge.

Thus the rigid area associated with the locking member is moved to the rear, i.e. to the same end as the connecting means, so that the opposite (front) end is free of any rigid area and is therefore more readily deformable. This increased deformability reduces injury in the event of an impact with a pedestrian.

The locking member is advantageously equidistant from two lateral edges of the hood.

The connecting devices advantageously include hinges.

In this way, the hood is rotatably mounted on the chassis.

The connecting devices advantageously include slides.

In this way, the hood is slidably mounted on the chassis.

The hood advantageously includes a safety catch operative in its closed position.

The safety catch is advantageously nearer the front edge of the wall than the rear edge of the wall.

The safety catch advantageously includes a hook adapted to engage in the chassis.

The invention also provides a vehicle which includes a vehicle hood according to the present invention.

The invention also provides a vehicle including a chassis and a hood having a wall, connecting devices fixed to the wall and to the chassis so that the hood is mobile on the chassis, a connecting means being nearer a rear edge of the wall than its other edges, and a locking member fixed to the wall for locking the hood to the chassis in a closed position, and nearer the rear edge of the wall than a front edge of the wall opposite the rear edge.

The locking member advantageously includes a lock adapted to be connected to the chassis.

The locking member advantageously includes a cable connected to the hood.

The hood is advantageously mounted on the chassis so that it can rotate and move in translation.

The hood advantageously includes at least one bracket adapted to cooperate with an orifice formed in a boss projecting from a wing of the vehicle.

The invention also provides a vehicle hood including a wall, connecting devices for mounting the mobile hood on a vehicle chassis fixed to the wall, the connecting devices being nearer a common first edge of the wall than the other edges of the wall, and a locking member fixed to the wall for locking the hood to the chassis in a closed position, which locking member is nearer the first edge of the wall than an edge of the wall opposite the first edge.

Other features and advantages of the invention will become apparent in the course of the following description of a preferred embodiment of the present invention, which description is given by way of non-limiting example.

DETAILED DESCRIPTION OF THE PREFERRED EMBODIMENT

Figure 1:
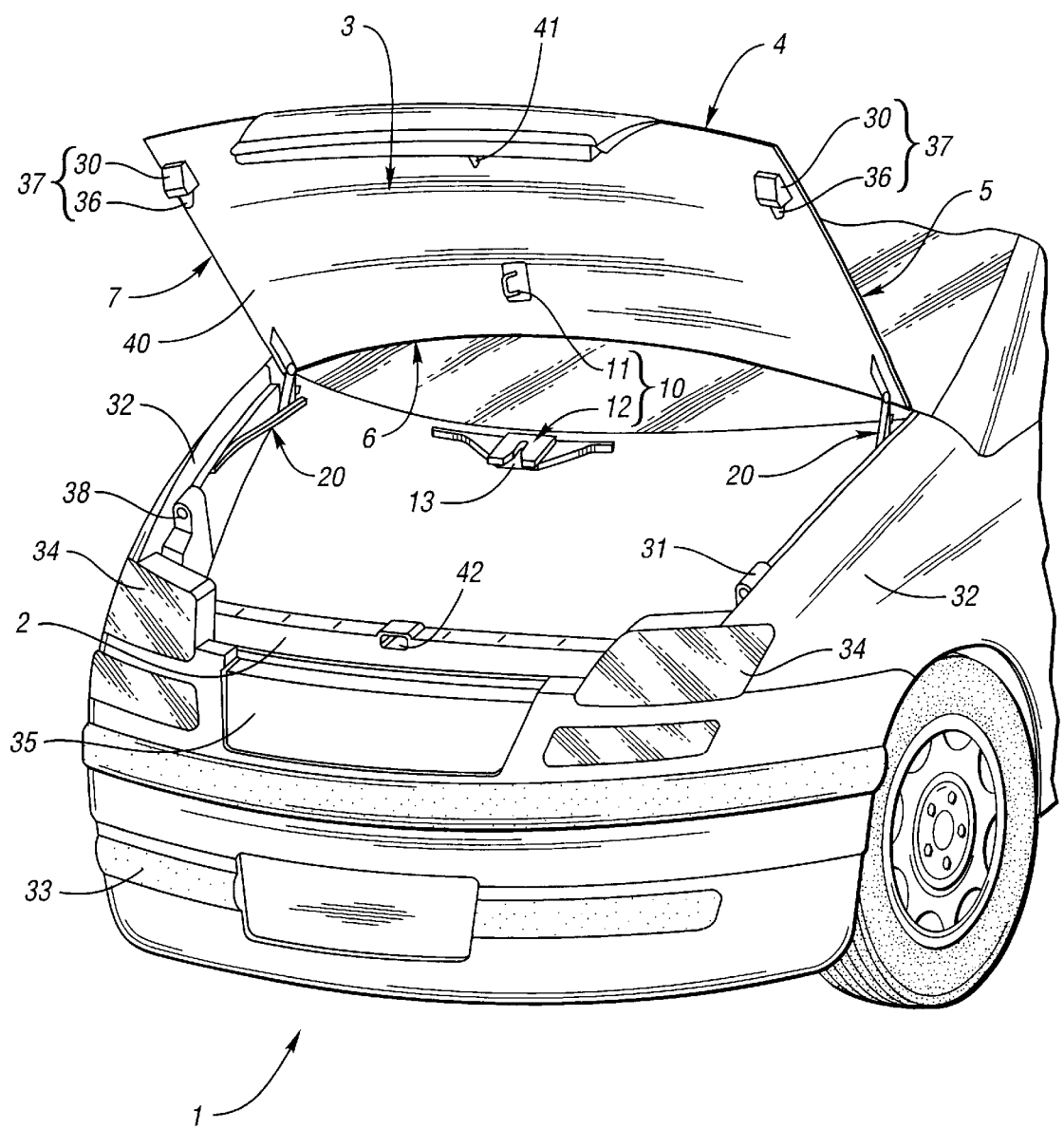
FIG. 1 is a partial three-dimensional view of the front of a vehicle.

Referring to FIG. 1, the front body shell 1 of a vehicle in accordance with the present invention includes a scuttle 33, a grille 35, two wings 32, two light units 34 at the front ends of the wings 32 and on respective opposite sides of the grille 35, and a hood 3, the bodyshell as a whole covering a chassis, of which only a portion 2 is shown.

The hood 3 includes a wall 40 delimited by a more or less convex front edge 4, a more or less straight right-hand edge 5, a more or less concave rear edge 6 and a more or less straight left-hand edge 7.

The vehicle has a locking member 10 near the rear edge 6. The locking member includes a lock 12 which is adapted to be connected to a portion of the chassis of the vehicle that is not shown and includes a receiving notch 13 that is flared at its front end and blind at its rear end. The locking member 10 further includes a loop 11 projecting from the inside face of the wall 40 of the hood 3 and connected to that wall 40. The loop 11 is adapted to be received in the notch 13 of the lock 12 when the hood 3 is closed, so locking it in its closed position. As in the prior art, the locking member 10 further includes a cable, not shown, which can be operated from the passenger compartment of the vehicle to unlock the hood 3 when it is locked in its closed position: the cable releases the loop 11 from the lock 12 so that the hood can be opened.

The hood 3 includes a symmetrical pair of brackets 37 near the front edge 4, with one on each lateral side of the wall 40, near the right-hand and left-hand edges 5 and 7, respectively; the respective body 30 of each bracket projects from the lower face of the wall 40. A circular section stud 36 projects from the body 30 parallel to the wall 40 of the hood 3 and toward the rear edge 6. The studs 36 are adapted to engage in orifices 38 formed in the front faces of respective bosses 31 projecting from respective inner wings 32.

The hood 3 includes connecting devices 20 which connect it to the chassis of the vehicle and enable it to move relative thereto. They are respective connecting devices 20 near the right-hand and left-hand edges 5, 7 of the wall 40, near the rear edge 6. Note that FIG. 1 does not show the connecting devices 20 mounted on the hood 3 completely, but that FIG. 2 does.

Figure 2:
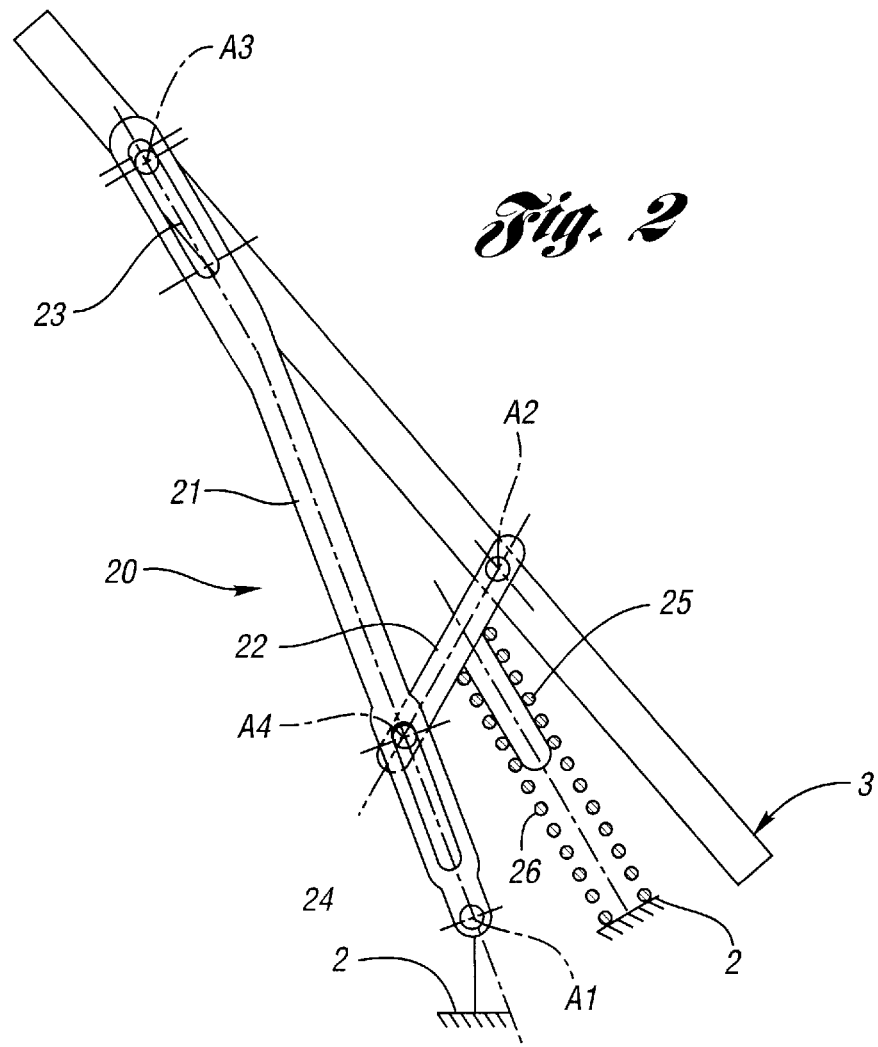
FIG. 2 is a profile view showing how the hood of the vehicle shown in FIG. 1 is connected to the chassis.

Referring to FIG. 2, each of the connecting devices 20 includes two arms 21 and 22. The arm 21 can rotate on the chassis of the vehicle about a horizontal pin A1 perpendicular to the direction of motion of the vehicle. A rear portion of the arm 21 includes a slot 24 in which a pin A4 parallel to the pin A1 can slide. The arm 21 has a second part that extends the first part toward the front at an angle α. The second part includes a slot 23 in which a pin A3 attached to the hood 3 and parallel to the pins A1 and A4 slides. The arm 22 is fastened at one end to the pin A4. At its other end it has a second pin A2 which is parallel to the pins A1, A3 and A4 and connects the arm 22 to the hood 3 by an arrangement that can rotate about the pin A2. The arm 22 further includes a support 25 projecting toward the rear on the same side as the pin A1 when the arm 22 is mounted in the connecting device 20. The support 25 is fastened to the arm 22 and receives a spring 26 whose rear end is fastened to the chassis of the vehicle and whose front end bears on the arm 22. In this example the spring 26 is a coil spring. In a different embodiment, not shown, the support 25 can rotate relative to the arm 22 about an axis parallel to one of the pins A2, A4.

Figure 4:
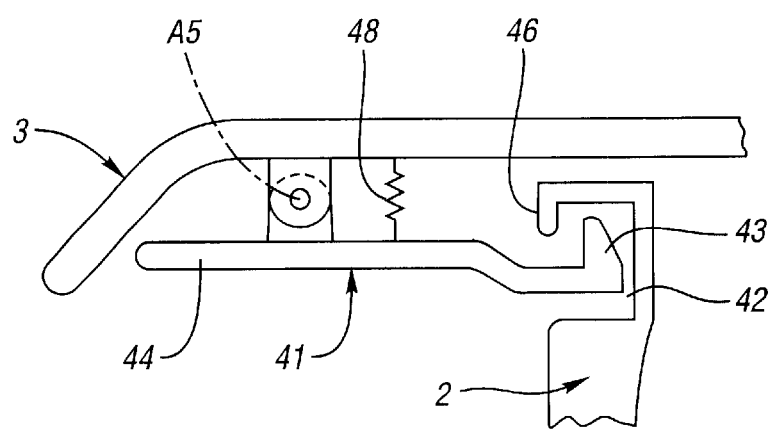
FIG. 4 is a diagrammatic view of a safety catch for the hood of the vehicle shown in FIG. 1.

Referring to FIG. 4, the vehicle includes a safety catch 41, 42. The safety catch includes a housing 42 formed in the front portion 2 of the chassis of the vehicle, above the grille 35. The opening of the housing 42 is partly closed at the top by a tongue 46. The safety catch further includes a latch 41 having at the rear a hook 43 that is received freely in the housing 42 via its opening and at the front a manipulator arm 44. The latch 41 is mounted on the hood 3 so that it can rotate about a horizontal pin A5 perpendicular to the direction of movement of the vehicle and extending between the arm 44 and the hook 43. A return spring 48 connects the latch 41 and the hood 3 so that the hook 43, when it is not manipulated in any way, is held as close as possible to the wall of the hood 3.

Figure 3A:
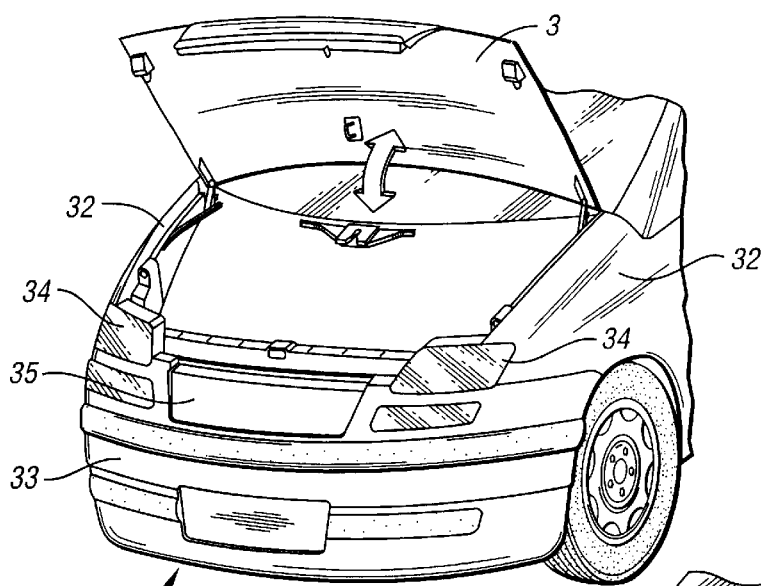
FIGS. 3a, b and c are partial three-dimensional views of the front of the vehicle shown in FIG. 1 and show the steps of closing the hood.
Figure 3B:
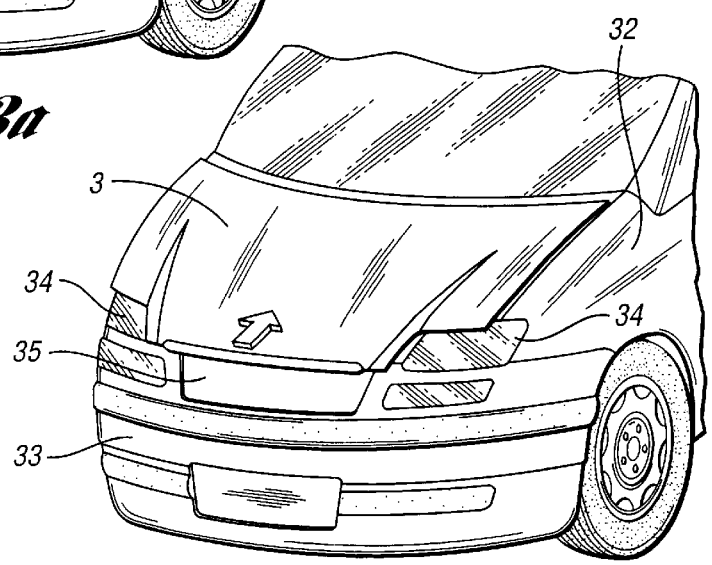
Figure 3C:
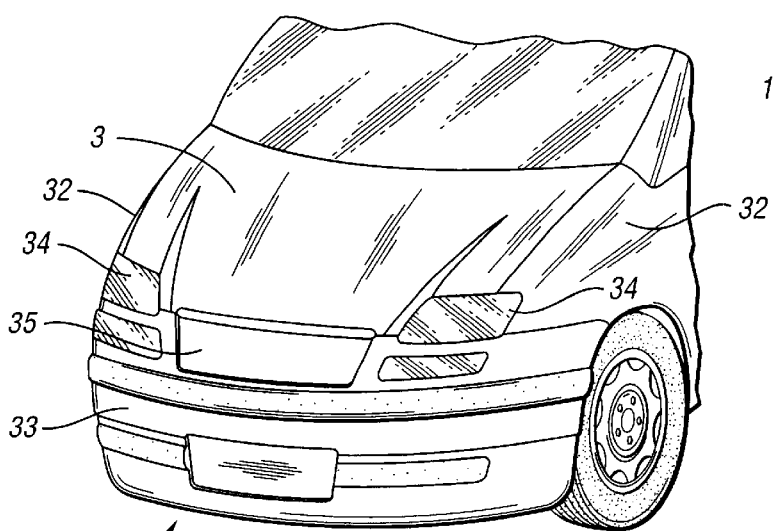

Referring to FIGS. 3a to 3c, assume that the hood 3 is raised to its open position, as shown in FIG. 3a. The pins A3 and A4 are at the end farthest from the pin A1 of the respective slots 23 and 24 because of the thrust that the spring 26 applies to its support 25, which is connected to the arm 22. The connecting devices 20 are therefore as shown in FIG. 2. Closure of the hood begins with a downward rotation about the pin A1 of the connecting devices 20, which rotation continues until the hood 3 reaches the position shown in FIG. 3b. The pins A3 and A4 then remain in the same position within their respective slots, because of the thrust of the spring 26. Also, the loop 11 is then in front of the notch 13 of the lock 12. Similarly, the hook 43 of the latch 41 is in front of the opening of the housing 42 but disengaged from it.

Closure then continues through movement of the hood in translation in a direction slightly above the horizontal and toward the rear of the vehicle. The pins A3 and A4 slide in their respective slots 23, 24 towards their rear end. The movement in translation:

compresses the springs 26;

engages the hook 43 of the latch 41 freely in the housing 42, the spring 48 ensuring that the hook 43 is raised well behind the tongue 46;

engages the loop 11 in the notch 13 of the lock 12, up to the point at which locking of the lock 12 is triggered; and engages each of the studs 36 in the opening of the respective boss 31 in the respective wing 32.

The hood 3 is therefore locked in a closed position, as shown in FIG. 3c.

Now assume that the hood is in its locked closed position, as shown in FIG. 3c. Operating the unlocking cable overrides the lock 12, releasing the loop 11. Because of the thrust of the springs 26, the hood begins to move in translation in a direction slightly below the horizontal and toward the front of the vehicle, and the hook 43 then abuts against the tongue 46. Action on the arm 44 of the latch 41 then releases the hook 43 by disengaging it from the housing 42. The movement of the hood in translation continues because of the thrust of the spring 26. The loop 11 disengages from the notch 13 of the lock 12 and the studs 36 disengage from the openings in the bosses 31. The movement in translation is interrupted when the pins A3 and A4 abut against the front ends of the respective slots 23, 24. FIG. 3b shows the position of the hood at this moment. Then, upward movement in rotation about the pin A1 raises the hood to its open position.

Of course, many modifications can be made to the present invention without departing from the scope of the invention.

In particular, the connecting devices can be hinges so that the hood is mounted on the chassis to rotate about only one axis.

The return spring of the safety catch can be a tension spring or a torsion spring mounted on the pin.

The latch can be fastened to the hood at the end opposite the hook, the body of the latch serving as a return spring.

There is claimed:

1. A vehicle hood including a wall, connecting devices for slidably mounting said hood on a vehicle chassis fixed to said wall nearer a rear edge of said wall than to a front edge of said wall opposite said rear edge and a locking member fixed to said wall for locking said hood to said chassis in a closed position, which locking member is nearer said rear edge of said wall than to said front edge and said locking mechanism is locked in response to rearward sliding of said hood.

2. The vehicle hood claimed in claim 1, wherein said locking member is equidistant from two lateral edges of said hood.

3. The vehicle hood claimed in claim 1, wherein said connecting devices include hinges.

4. The vehicle hood claimed in claim 1, wherein said connecting devices include slides in which said hood is slidably mounted.

5. The vehicle hood claimed in claim 1, including a safety catch, wherein the catch is operative when the hood is in the closed position.

6. The vehicle hood claimed in claim 5, wherein said safety catch is nearer said front edge of said wall than said rear edge of said wall.

7. The vehicle hood claimed in claim 5, wherein said safety catch includes a hook adapted to engage a tongue in said chassis in response to the rearward sliding of the hood.

8. A vehicle including a hood including a wall, connecting devices for slidably mounting said hood on a vehicle chassis fixed to said wall nearer a rear edge of said wall than to a front edge of said wall opposite said rear edge and a locking member fixed to said wall for locking said hood to said chassis in a closed position, which locking member is nearer said rear edge of said wall than to said front edge and said locking mechanism is locked in response to rearward sliding of said hood.

9. The vehicle claimed in claim 8, wherein said locking member is equidistant from two lateral edges of said hood.

10. The vehicle claimed in claim 8, wherein said connecting devices include hinges.

11. The vehicle claimed in claim 8, wherein said connecting devices include slides in which said hood is slidably mounted.

12. The vehicle claimed in claim 8, including a safety catch, wherein the catch is operative when the hood is in the closed position.

13. The vehicle claimed in claim 12, wherein said safety catch is nearer said front edge of said wall than said rear edge of said wall.

14. The vehicle claimed in claim 12, wherein said safety catch includes a hook adapted to engage a tongue in said chassis in response to the rearward sliding of the hood.

15. A vehicle including a chassis and a hood having a wall, connecting devices fixed to said wall and to said chassis so that said hood is mobile on said chassis nearer a rear edge of said wall than a front edge of said wall opposite said rear edge, and a locking member fixed to said wall for locking said hood to said chassis in a closed position, which locking member is nearer said rear edge of said wall than to said front edge and said locking mechanism is locked in response to rearward sliding of said hood.

16. The vehicle claimed in claim 15, wherein said locking member includes a lock adapted to be connected to said chassis.

17. The vehicle claimed in claim 15, wherein said locking member includes an unlocking cable.

18. The vehicle claimed in claim 15, wherein said hood is mounted on said chassis so that it can rotate and move in translation.

19. The vehicle claimed in claim 15, wherein said hood includes at least one bracket having a stud and the stud is adapted to cooperate with an orifice formed in a boss projecting from a wing of said vehicle when said hood is in the closed position.

20. The vehicle claimed in claim 15, wherein said locking member comprises a loop adapted to be engaged in a notch in response to the rearward sliding of said hood.

* * * * *